United States Patent
Tian et al.

(10) Patent No.: US 10,789,630 B2
(45) Date of Patent: Sep. 29, 2020

(54) PREDICTIVE ENGINE FOR ONLINE DISTRIBUTION OF SENSITIVE TRANSACTION PROCESSING INFORMATION

(71) Applicant: PAYPAL, INC., San Jose, CA (US)

(72) Inventors: Cheng Tian, San Jose, CA (US); Akshay Sanjeevaiah Krishnaiah, San Jose, CA (US); Jiri Medlen, Fullerton, CA (US)

(73) Assignee: PAYPAL, INC., San Jose, CA (US)

( * ) Notice: Subject to any disclaimer, the term of this patent is extended or adjusted under 35 U.S.C. 154(b) by 774 days.

(21) Appl. No.: 15/289,762

(22) Filed: Oct. 10, 2016

(65) Prior Publication Data
US 2018/0101881 A1 Apr. 12, 2018

(51) Int. Cl.
*G06Q 30/00* (2012.01)
*G06Q 30/06* (2012.01)
*G06Q 40/00* (2012.01)
G06Q 50/14 (2012.01)
G06Q 50/00 (2012.01)
G06N 5/02 (2006.01)

(52) U.S. Cl.
CPC ......... *G06Q 30/0609* (2013.01); *G06Q 40/00* (2013.01); *G06N 5/022* (2013.01); *G06Q 50/01* (2013.01); *G06Q 50/14* (2013.01)

(58) Field of Classification Search
CPC .. H04L 12/1831; G06Q 10/00; G06Q 20/405; G06Q 30/0601–0645; G06Q 30/80
USPC ..... 705/26.1, 27.1, 26.2, 26.25, 26.3, 26.35, 705/26.4, 26.41, 26.42, 26.43, 26.44, 705/26.5, 26.6, 26.61, 26.62, 26.63, 705/26.64, 26.7, 26.8, 26.81, 26.82, 26.9, 705/27.2
See application file for complete search history.

(56) References Cited

U.S. PATENT DOCUMENTS

| | | | |
|---|---|---|---|
| 7,478,054 B1 | 1/2009 | Adams et al. | |
| 2010/0121745 A1* | 5/2010 | Teckchandani | G06Q 10/00 705/30 |

(Continued)

FOREIGN PATENT DOCUMENTS

WO WO 2015/179063 11/2015

OTHER PUBLICATIONS

Anonymous, "Mobile payment apps help students split the bill," University Wire, Apr. 13, 2015.*

*Primary Examiner* — Brandy A Zukanovich
(74) *Attorney, Agent, or Firm* — Haynes and Boone, LLP

(57) ABSTRACT

There are provided systems and methods for a predictive engine for online distribution of sensitive transaction processing information. A first user may utilize a communication device to perform transaction processing, which may cause generation of a transaction history, such as a receipt, that documents the transaction. The first user may utilize a service that may post or distribute the transaction history for other users to view, including a second user. In order to preserve the first user's privacy, the service provider may perform predictive analysis of whether the transaction history should be distributed, for example, by hiding the transaction history from the second user if the first user owes the second user money. In further embodiments, the transaction history may be distributed to the second user that would not normally receive the transaction history if it would be of interest to the second user.

20 Claims, 5 Drawing Sheets

(56) References Cited

U.S. PATENT DOCUMENTS

| | | | |
|---|---|---|---|
| 2012/0143761 A1* | 6/2012 | Doran | G06Q 20/08 705/44 |
| 2013/0054407 A1 | 2/2013 | Sabur | |
| 2014/0081750 A1* | 3/2014 | Hosp | G06Q 30/0207 705/14.53 |
| 2015/0281159 A1* | 10/2015 | Abuelsaad | H04L 51/20 709/206 |
| 2016/0042328 A1 | 2/2016 | Teckchandani et al. | |
| 2016/0253710 A1 | 9/2016 | Publicover et al. | |

* cited by examiner

PREDICTIVE ENGINE FOR ONLINE DISTRIBUTION OF SENSITIVE TRANSACTION PROCESSING INFORMATION

TECHNICAL FIELD

The present application generally relates to online posting and sharing of data, and more specifically to a predictive engine for online distribution of sensitive transaction processing information.

BACKGROUND

Various types of service providers may provide processing services to users, merchants, other types of businesses, and different entities. Such processing services may include processing for transactions between a user and another entity, such as another user, merchant, business, or other entities that may engage in transactions with users. When users process a transaction, they may be provided with a transaction history of the transaction, for example, a receipt. In various embodiments, the transaction history may include additional information, such as item information for items purchase in the transaction, merchant information for a merchant selling the items, and other associated information, such as a location or a comment by a user in the transaction. A user may therefore wish to share the transaction history with other users, for example, through a social networking feed or a feed within a mobile transaction processing application. However, the user may also have other obligations or sensitivities to users that may cause the user to not wish to share the transaction history with certain other users, for example, if the user has debts to those certain other users. In other embodiments, the transaction may be private, and the user may only wish to share the transaction history with certain users, such as a present for a child that may be shared with a spouse but not the child or relatives that may spoil the secret for the child.

Figure 1:
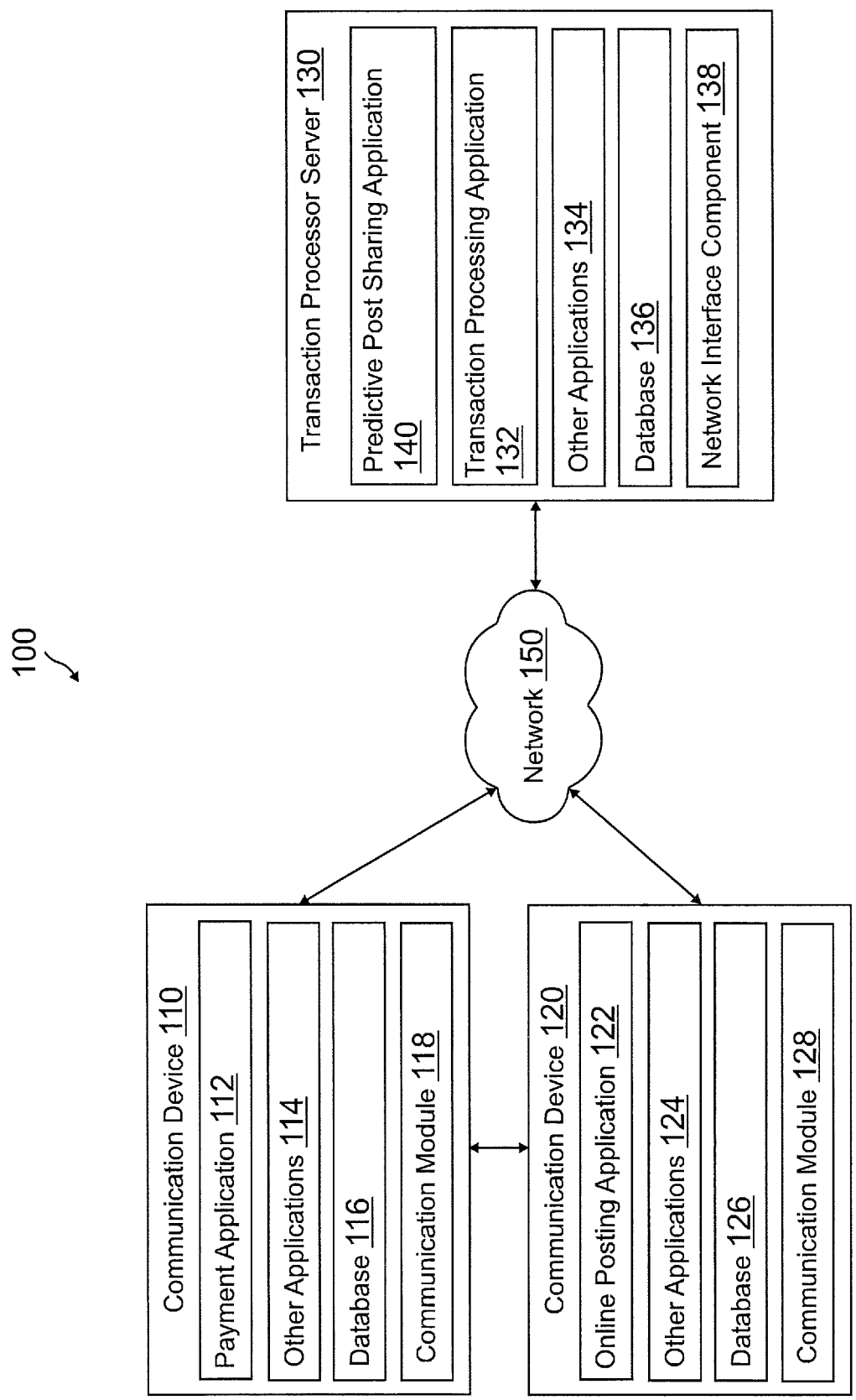
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a predictive engine for online distribution of sensitive transaction processing information. Systems suitable for practicing methods of the present disclosure are also provided.

According to various embodiments, a user may engage in processing for a transaction, which, once processed, may cause generation of a transaction history, such as a receipt, as well as additional information, comments, or other sharable data associated with the transaction (e.g., data that a user would wish another user to view, which may not include sensitive information, such as financial data). For example, a service provider may provide transaction processing services to the user, which may be provided through an account that allows the user to engage in transaction processing, payments, and transfers with other users and/or merchants. In various embodiments, the receipt may be provided by the merchant, where a service provider processing the transaction using an account of the user may receive the receipt, and may generate a transaction history having the receipt and the additional sharable data. Thus, the user, the merchant, and/or the service provider may add or provide the additional sharable data. Once the transaction history is generated, the service provider may execute a predictive engine, which may be provided through one or more applications executable by the service provider, that determines whether any portions of the transaction history for the user should be shared with one or more other users, and when at least some of the transaction history should be shared. For example, account information for the user and/or the user's account may be processed with transaction information for the transaction in the transaction history. As used herein, transaction history may include a portion (i.e., specific data or content) or all of the transaction history. For example, a user may wish to share only a portion of a transaction history, such as a purchased item and/or a merchant, while omitting other information, such as amount of the transaction. The service provider may receive confidentiality concerns or preferences of the user, or may determine what the user would like to share based on past shared transaction histories of the user. In other embodiments, the service provider may determine what information to share, as discussed herein.

The account information may include contacts of the other user and their relationship with the user or their communications with the user. The contacts may be used to determine interests of the other users, which may be in common with the transaction history. In other embodiments, the contacts may be used to determine shared travel or travel of interest to the other users, shopping lists, birth dates, anniversaries, other important event dates that may be linked to a present, social networking posts, messages, communications, and/or events, which may be compared to the transaction history. In some embodiments, other types of account information may be used, including incoming payment requests from other users, a financial graph of the user, debts and assets of the user or other users, and/or past transactions of the user with other users including communication of those transaction histories to the other users by the user. Thus, the service provide may make predictions on which users are able to view the transaction history on a sharing or communication platform, for example, by hiding the transaction history from other users that may be surprised or upset with the transaction or may be gifted an item in the transaction and/or sharing the transaction history with other users that may be interested in the transaction or an item in the transaction. In this regard, a time for when the transaction history may also be determined, such hiding the transaction until after a gifting date or a debt is repaid, or immediately sharing the transaction with an interested party. Once other users that may receive the shared transaction are determined, as well as when to share the transaction, the transaction history may be associated with an electronic post, message, or other communication that may share the transaction history with other users. The service provider may then share the transaction history using a messaging, social networking, transaction history sharing, or other communication platform. Additionally, the service provider may use the transaction information, the account information, and/or additional information for other users to determine a portion to omit or reveal from the transaction history, such as hiding a cost from other users if the other users would be offended at the cost, or reveal a merchant name and item to a user that may have interest in the item. Thus, the service provider may selectively reveal or hide specific information corresponding to a portion of the transaction information in the transaction history based on sensitive information and/or predicted reactions, interests, or comments by other users.

Thus, one or more users may engage in electronic transaction processing with one or more other entities, such as merchants or other users. For example, a user may wish to provide a payment to a merchant for a transaction, such as a purchase of one or more items, or other type of required payment or transfer of money by the user to the merchant or another user. The service provider processing transactions for the user may further provide additional types of services, including account services and digital wallet services, for example, to store one or more financial instruments of the user for use in transaction processing and provide a digital wallet that may be utilized to perform transaction processing through tokenized payment services. Thus, the user and/or the merchant may further be required to establish an account with the service provider in order to engage in transaction processing. The user and/or the merchant may be required to provide personal, business, or other identification information to establish the account, such as a name, address, Employer Identification Number (EIN), and/or other information. The user and/or the merchant may also be required to provide financial information, including payment cards (e.g., credit/debit cards), bank account information, gift cards, and/or benefits/incentives, which may be utilized to provide payments or otherwise engage in processing of another transaction. In order to create an account, the user and/or the merchant may be required to select an account name and/or provide authentication credentials, such as a password, personal identification number (PIN), security questions, and/or other authentication information.

The service provider may utilize such information to create the account for the user, and provide the user with a digital wallet that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a number unique to the wallet), as well as authentication information including an identifier for use of the digital wallet, which may be encrypted. The token may be communicated to a communication device of the user, where the communication device may store the token or may communicate the token to a merchant device during transaction processing for identification of the digital wallet and transaction processing. For example, the merchant may transmit the token back to the service provider with a payment request, where payment may be effectuated to the merchant through the digital wallet using the token.

Once an account is created, the account may be accessed through a web browser from a website of the service provider and/or a dedicated application of the service provider, such as a mobile smart phone application. The user and/or the merchant may engage in transaction processing through accessing their respective accounts and providing transaction information for the transaction. Thus, the aforementioned token may be issued to the user and/or the merchant for their respective accounts, where the token may include data (which may be encrypted) allowing the service provider to identify the user and/or the merchant and their accounts, as well as authenticate the user and/or the merchant. As such, the token may be transmitted to other entities during transaction processing through accessing the account on the website of the service provider or through the dedicated application, which may allow the service provider to identify and authenticate the user's and/or the merchant's account and engage in transaction processing. Thus, a computing device for a user and/or a merchant, such as a communication device of a user or a merchant point-of-sale device of a merchant, may further include a mobile payment application or more generally a transaction processing application, which may be configured to send and receive payments to another party, such as another user and/or a merchant, or otherwise engage in transaction processing.

In various embodiments, a website may provide the transaction processing services, and thus may be accessed by a web browser application. The website, a webpage interface, and/or an interface of the dedicated application may include a feed that may share transaction histories of other users, such as friends through a social networking platform, contacts in a contact book, past user transactions with a user, or other users in contact with the user. The feed may correspond to a timeline of shared transaction histories by the other users, as well as information within those transaction histories. However, the service provider may delay posting of a transaction history and/or hide a transaction history of a user based on predictive analysis of the user's interesting in hiding or delaying posting of a transaction history.

Thus, once a receipt or other type of transaction history for a user is received by the service provider, the service provider may analyze transaction data within the transaction history to determine whether the transaction history should be posted. In certain embodiments, the transaction data may include information that prevents sharing, which may be general or specific to other users or an amount of time. For example, certain transactions may be deemed private or confidential, such as purchase of personal or confidential products, items, or services. Other transactions may include a term or review prior to authorization and/or may include large purchases (e.g., a vehicle or property) that may be private to a user.

However, with other types of transactions, including daily transactions, transaction for travel or entertainment, and/or transactions for personal use items, the service provider may be required to access account information for the user that processed the transaction using an account of the user with the service provider. The account information may include financial assets or debts of the user, contacts of the user, transaction sharing preferences of the user, a financial graph of the user, incoming payment requests by the user, past purchases of the user, a shopping list of the user, a calendar of the user, or past shared transactions of the user. In this regard, the account information may be used to determine when and with what other users the transaction history is shared. For example, if the user owes another user money or has an outstanding debt or payment request from another user, a transaction history may be specifically withheld from sharing with that other user or with all users in general, for example, where other friends of the user may communicate the shared transaction history to the other user owed the debt by the user. The transaction history may be permanently withheld, or may be withheld until expiration of some time period, which may correspond to repayment of the owed debt. Conversely, where another user has requested that the user purchase a product (e.g., through a shared shopping list, purchase request, shared event or travel, calendar having an upcoming event, etc.), the transaction history be shared specifically with this party. Other predictive analysis may be performed to determine whether to share or withhold the transaction history, and for how long.

For example, in various embodiments, additional information for other users known to the user may be accessed or retrieved based on the account information, for example, through social networking information, contact information, or past communications within the account information. The additional information for the other users may include information that may be indicative of an interest of another user, travel of the other user, one or more events attended by the other user, or potential interests of the other user that may be determined from other information scraped of the user. For example, the additional information may include social networking posts and information, past purchases, a wish list or shopping list of purchases, communications by the user, travel arrangements, and/or event tickets or other admission held or purchased by the other user. Thus, using such information, the service provider may determine that a transaction history that would normally not be shared, or not be shared with the other user, instead should be shared with the other user, for example, if the other user would be interested in the purchase by the user (e.g., to arrange similar travel, share an interest, attend an event, inquire into a review of a purchased item, etc.).

In various embodiments, the transaction history may be immediately shared, or may be shared after a certain time period, such as when the other user may find the transaction history interesting or informative. The information for the other users may also include birth dates, upcoming gift dates, or other dates where a transaction processed by the user may be for an item purchased for another user. In this regard, a transaction history for a gift may be hidden from at least the other user that the gift is intended for, and may further be hidden for all other users or at least a subset of users that may share the gift with the other user. The transaction history may eventually be revealed after expiration of the gifting date. Other dates may also correspond to dates where the transaction history should be hidden from another user, for example, holidays, parties, vacation travel, or events.

Moreover, financial information for the user may be stored to the account and retrieved in the account information to determine whether a transaction history is shared with one or more other users. For example, the financial information may correspond to a financial graph of the user that includes assets, debts, as well as various incomes and expenditures. The financial graph may be utilized to determine when a transaction history for the user is posted or when the transaction history may be hidden. Thus, where a transaction history may cause another user that is owed a debt or upcoming expenditure to inquire about the transaction, the transaction history may be hidden from the other user or from all users in general. Conversely, where a transaction history may be associated with a new asset purchased by the user, or an additional income stream or potential income stream of the user, the transaction history may be shared with other users in general or those users that may be interested in the asset or income stream. Thus, the user's financial graph may be used to make predictive analysis of discretionary hiding or revealing of transactions histories.

In order to share one or more transaction histories, the service provider may determine one or more platforms to communicate a transaction history to known contacts of the user generating the transaction history. For example, the service provider may share or communicate the transaction history to other known users through a social networking platform, email, instant message, text, other electronic communication platform, advertisement through an electronic communication channel, and/or a feed within a transaction processing service, such as a feed in a dedicated application or website of the service provider. The platform used to share or communicate the transaction history may depend on which platforms the user utilizes and/or has a preference for sharing on, or which platforms the other users have available to utilize. Additionally, the service provider may share or communicate the transaction history based on the other users designated to receive or to not receive (e.g., users that the transaction history is hidden from), as well as when the transaction history should be shared.

The service provider may also provide an interface or executable process for the user to make changes to the other users that may receive or may not receive a post or communication of the transaction history, as well as when the transaction history is shared. For example, the user may be able to view a full history of the user's receipts and other transaction histories. The service provider may associate information for which users will be able to view or receive the transaction history, and when the transaction will be shared with each transaction history in the interface. The user may then view the transaction history, and may utilize one or more processes to change users receiving the transaction history (e.g., by adding or removing identifiers), how the transaction history is shared, and/or when the transaction history is shared. In various embodiments, all transaction histories may be hidden for an amount of time to allow the user to review each transaction for sharing, which may correspond to a preset amount of time by the user or the service provider, or may be set until review of all of the transaction histories.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a communication device 120, and a transaction processor server 130 in communication over a network 150. A user (not shown) may utilize communication device 110 to utilize the various features available for communication device 110, which may include processes and/or applications associated with transaction processing for a transaction between the user and a merchant. Such transaction processing may generate a transaction history. Another user (not shown) associated with communication device 120 may receive the transaction history or may not receive the transaction history based on predictive analysis of sharing the transaction history determined by transaction processor server 130.

Communication device 110, communication device 120, and transaction processor server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with communication device 120, and/or transaction processor server 130. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a payment application 112, other applications 114, a database 116, and a communication module 118. Payment application 112 and other applications 114 may correspond to executable processes, procedures, and/or applications with associated hardware. In other embodiments, communication device 110 may include additional or different modules having specialized hardware and/or software as required.

Payment application 112 may correspond to one or more processes to execute software modules and associated devices of communication device 110 to enter one or more payment instruments or other funding sources for storage in a digital wallet associated with a payment account (e.g., stored and/or serviced by transaction processor server 130) and engage in transaction processing with another entity, such as a merchant. In this regard, payment application 112 may correspond to specialized hardware and/or software utilized by a user of communication device 110 that initially provides an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.) Such information may be stored with transaction processor server 130 for use with an online digital wallet stored to an account for the user with transaction processor server 130, which may be utilized for transaction processing with another entity, such as a merchant associated with communication device 120. In various embodiments, information for the account may also be stored to communication device 110, including digital wallet information and/or a token associated with the digital wallet for use in transaction processing. The account accessible through payment application 112 may be used to initiate, receive, and/or process/complete transactions using services provided by transaction processor server 130. Once entered, the payment instruments may be communicated to transaction processor server 130 over network 150 by payment application 112 for establishment and/or maintenance/update of the account and/or entry into the digital wallet for the user. The user of communication device 110 may also enter discounts and/or benefits to payment application 112 for storage to the digital wallet and use during transaction processing.

Payment application 112 may utilize one or more user interfaces, such as graphical user interfaces presented using an output display device of communication device 110, to enable the user associated with communication device 110 to perform transaction processing. Such interfaces may also include transaction history review associated with transaction processor server 130, including requests to change distribution information or guidelines for distribution of one or more transaction histories. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for transaction processor server 130), presenting the website information to the user, and/or communicating information to the website. However, in other embodiments, payment application 112 may include a dedicated application of transaction processor server 130 or other entity (e.g., a merchant), which may be configured to assist in processing transactions. The interface(s) providing by payment application 112 may be utilized to enter transaction information, receive transaction information from communication device 120, initiate a process to process a transaction, and/or review transaction histories. For example, one or more of the interfaces may display a list of transaction histories to the user, where the user may view where the transaction histories may be shared, with what other users the histories may be shared, and when the histories may be shared. The user may utilize such an interface to submit a request to change one or more of the aforementioned elements to transaction processor server 130, for example, by adding or removing other users through their identifiers, changing a communication platform, and/or changing a time of distribution.

Payment application 112 may be utilized to select payment instrument(s) for use in providing payment for a purchase transaction, transfer, or other financial process. As discussed herein, payment application 112 may utilize user financial information, such as a credit card, bank account, or other financial account, as a payment instrument when providing payment information. Additionally, payment application 112 may utilize a digital wallet stored to an account with a payment provider, such as transaction processor server 130, as the payment instrument, for example, through providing a token that identifies the account and authenticates the user for use of the account. Payment application 112 may use a token during transaction processing to authenticate the user and complete transaction processing by providing the token, which may be encrypted and/or provided through a secure channel, to a merchant device and/or transaction processor server 130 to authenticate the user and/or the user's payment account, digital wallet, and/or payment instruments with transaction processor server 130 and allow for transaction processing and payment using the user's payment account, digital wallet, and/or payment instruments. Payment application 112 may be utilized to view the results of payment, for example, using transaction histories, dispute resolution processes, and other post-transaction process.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to transaction processor server 130. In various embodiments, account information and/or digital wallet information may be stored to database 116 for use by communication device 110, including received information for one or more transaction histories.

Communication device 110 includes at least one communication module 118 adapted to communicate with communication device 120 and/or transaction processor server 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., communication device 120) using short range communications, such as Bluetooth Low Energy, LTE Direct, WiFi, radio frequency, infrared, Bluetooth, and near field communications.

Communication device 120 may be implemented as a communication device that may utilize appropriate hardware and software configured for wired and/or wireless communication with communication device 110, and/or transaction processor server 130. For example, in one embodiment, communication device 120 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 120 of FIG. 1 contains an online posting application 122, other applications 124, a database 126, and a communication module 128. Online posting application 122 and other applications 124 may correspond to executable processes, procedures, and/or applications with associated hardware. In other embodiments, communication device 120 may include additional or different modules having specialized hardware and/or software as required.

Online posting application 122 may correspond to one or more processes to execute software modules and associated devices of communication device 120 to access a communication platform, including social networking, transaction processing and history sharing, and/or messaging service, in order to view received communications from other users including shared transaction histories. In this regard, online posting application 122 may correspond to specialized hardware and/or software utilized by a user of communication device 120 that initially provides an interface to permit the user to establish an account or otherwise access the communication platform, for example, by providing authentication credentials and/or personal/contact information. In other embodiments, the communication platform may be freely accessible. Additionally, in certain embodiments, the communication platform may correspond to a transaction processing service provided by transaction processor server 130, where the communication platform allows users to view other processed transactions by other users and their transaction histories, as well as send and receive money between users (e.g., VENMO®). Thus, the communication platform may provide additional services to the viewing and interacting with one or more transaction histories posted by transaction processor server 130 for a user associated with communication device 110.

Online posting application 122 may utilize one or more user interfaces, such as graphical user interfaces presented using an output display device of communication device 120, to enable the user associated with communication device 120 to view received transaction histories. Such interfaces may also include transaction history review associated with transaction processor server 130, including transaction information for the transaction histories, such as items in the transaction, a cost, comments to the transaction, a merchant, and other information provided with the transaction. In various embodiments, online posting application 122 may correspond to a general browser application configured to retrieve, present, and communicate information over the Internet (e.g., utilize resources on the World Wide Web) or a private network. For example, online posting application 122 may provide a web browser, which may send and receive information over network 150, including retrieving website information (e.g., a website for transaction processor server 130), presenting the website information to the user, and/or communicating information to the website. However, in other embodiments, online posting application 122 may include a dedicated application of transaction processor server 130 or other entity (e.g., a merchant), which may be configured to assist in reviewing received transaction histories. The interface(s) providing by online posting application 122 may be utilized to interact with the transaction histories, including messaging the user associated with a displayed transaction histories, looking up transaction information (e.g., item or merchant information) from the transaction history, and/or commenting on the transaction history. As described herein, certain transaction histories may be hidden from online posting application 122 based on predictive analysis by transaction processor server 130.

In various embodiments, communication device 120 includes other applications 124 as may be desired in particular embodiments to provide features to communication device 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications that allow a user to send and receive emails, calls, texts, and other notifications through network 150. In various embodiments, other applications 124 may include financial applications, such as banking applications. Other applications 124 may also include other location detection applications, which may be used to determine a location for the user, such as a mapping, compass, and/or GPS application, which can include a specialized GPS receiver that obtains location information for communication device 120 and processes the location information to determine a location of communication device 120 and the user. Other applications may include social networking applications, media viewing, and/or merchant applications. Other applications 124 may include device interface applications and other display modules that may receive input from the user and/or output information to the user. For example, other applications 124 may contain software programs, executable by a processor, including a graphical user interface (GUI) configured to provide an interface to the user. Other applications 124 may therefore use devices of communication device 120, such as display devices capable of displaying information to users and other output devices, including speakers.

Communication device 120 may further include database 126 stored to a transitory and/or non-transitory memory of communication device 120, which may store various applications and data and be utilized during execution of various modules of communication device 120. Thus, database 126 may include, for example, identifiers such as operating system registry entries, cookies associated with online posting application 122 and/or other applications 124, identifiers associated with hardware of communication device 120, or other appropriate identifiers, such as identifiers used for payment/user/device authentication or identification, which may be communicated as identifying communication device 120 to transaction processor server 130. In various embodiments, one or more received transaction histories shared with online posting application 122 may be stored to database 126

Communication device 120 includes at least one communication module 128 adapted to communicate with communication device 110 and/or transaction processor server 130. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with nearby devices (e.g., communication device 110) using short range communications, such as Bluetooth Low Energy, LTE Direct, WiFi, radio frequency, infrared, Bluetooth, and near field communications.

Transaction processor server 130 may be maintained, for example, by an online service provider, which may provide transaction processing and payment services. In this regard, transaction processor server 130 includes one or more processing applications which may be configured to interact with communication device 110, merchant device 150, and/or another device/server to facilitate processing a transaction when communication device 110 does not have network connectivity by preloading a token preauthorized for a predicted amount required by the user. In one example, transaction processor server 130 may be provided by PAYPAL®, Inc. of San Jose, Calif., USA. However, in other embodiments, transaction processor server 130 may be maintained by or include another type of service provider, which may provide connection services to a plurality of users.

Transaction processor server 130 of FIG. 1 includes a predictive post sharing application 140, a transaction processing application 132, other applications 134, a database 136, and a network interface component 138. Transaction processing application 132 and other applications 134 may correspond to executable processes, procedures, and/or applications with associated hardware. In other embodiments, transaction processor server 130 may include additional or different modules having specialized hardware and/or software as required.

Predictive post sharing application 140 may correspond to one or more processes to execute software modules and associated specialized hardware of transaction processor server 130 to perform predictive analysis of received transaction histories to deter mine when and to what other users a transaction history should be shared with or communication to on a communication platform, including social networking and/or transaction history sharing feeds associated with transaction processor server 130. In this regard, predictive post sharing application 140 may correspond to specialized hardware and/or software to receive a receipt or other type of transaction history from another device, including communication device 110 and/or a merchant device. In other embodiments, the transaction history may be generated by transaction processing application 132 based on a transaction processed by transaction processing application 132. In various embodiments, the transaction history may include information sufficient to determine whether to post or hide the transaction history on the communication platform. For example, transaction histories for transactions over a certain amount may be hidden for privacy concerns, as well as transactions for private items as set by the user or determined from a set of standard private items. However, in other embodiments, predictive post sharing application 140 may be used to determine which transaction histories should be hidden, for how long, and from what other users the transaction histories should be hidden.

Thus, once the transaction history is received, an identifier that identifies the first user associated with communication device 110 may be used to retrieve account information for the account of the user. The account information may correspond to financial assets or debts of the user, contacts of the user, transaction sharing preferences of the user, a financial graph of the user, incoming payment requests by the user, past purchases of the user, a shopping list of the user, a calendar of the user, or past shared transactions of the user. The account information may be used to determine when a transaction history should be shared and with what other users, for example, by performing predictive analysis on whether it would be beneficial or detrimental to the first user to have another user view the transaction history, and/or whether the other user may have an interest in viewing the transaction history. The account information may also be utilized to access information for one or more contacts of the first user associated with communication device 110, such as a second user associated with communication device 120. For example, a contact list or social networking contacts may be used to retrieve user information or other information for the second user. The additional information for the second user may correspond to interests, travel, events, purchases, a financial graph, sent or requested financial or payment requests, a shopping or wish list of items, and/or other information about the second user. The account information may be used with the additional information in order to determine when a transaction history should be shared, and with what other users. For example, the second user may be interested in receiving the transaction history based on an interest, or may be upset viewing the transaction history based on an outgoing payment request to the first user.

Thus, the account information may include information that may be used by predictive post sharing application 140 to determine that a transaction history should not be shared with one or more users and/or should be hidden from the one or more users for a specific time period. Such embodiments may prevent sharing of the transaction history with one or more other users if it would be detrimental to the first user if the other user(s) view the transaction history. For example, the first user associated with communication device 110 may owe the second user associated with communication device 120 money from an incoming payment request. In other embodiments, a birthday for the second user may be upcoming, and the transaction history may be for a gift on a wish list of the second user. Other information may also be used, such as a social graph that shows who the first user normally shares transaction histories with, which may be specific to the items in the transaction histories. Thus, predictive post sharing application 140 may determine that the second user associated with communication device 110 should not view the transaction history, or the transaction history should be hidden from the second user for predicted time period, for example, until expiration of the birthday or repayment of the payment request. Thus, predictive post sharing application 140 may prevent transmission of the transaction history to communication device 120, which may be time dependent.

Additionally, the first user associated with communication device 110 generating the transaction may request all transactions are hidden, certain transactions should remain hidden, or certain users should not see a transaction history, and thus only certain transactions may be shared. For example, a social graph may indicate that the first user only shares transaction histories with his spouse and relatives. In such embodiments, the second user associated with communication device 120 may not be within this group and may not receive the transaction history. Thus, predictive post sharing application 140 may determine that a post should be shared with one or more other users that the post would normally not be shared with, such as the second user, or should be shared with one or more other users on fulfillment of some requirement. For example, the transaction history may be for an item on a shopping or wish list of the second user, and therefore the first user and the second user may wish to discuss the item. The transaction history may also be for shared travel between friends, which may be shared to the second user so that the second user may arrange similar travel or have the first user's travel arrangements. In other embodiments, the transaction history may be used to advertise to the second user, for example, where the second user may have a potential interest in the item based on past browsing history. Similarly, the transaction history may be for a shared shopping list, such as one between roommates or spouses, where the transaction history may be shared so that the second user does not purchase additional items already purchased in the transaction history.

Predictive post sharing application 140 may then share the transaction history or a communication platform according to the predictive analysis. In various embodiments, predictive post sharing application 140 may also provide the communication platform. For example, predictive post sharing application 140 may correspond to a social networking and/or transaction processing and history sharing service, such as one offered by VENMO® or PAYPAL®. In such embodiments, transaction histories may be shared through a platform provided by such a service according to the predictive analysis on when and with what other users the histories should be shared. However, in other embodiments, predictive post sharing application 140 may utilize a different platform, communication device, or electronic communication channel, including messaging, email, media sharing, and/or social networking (e.g., FACEBOOK®). Predictive post sharing application 140 may provide the transaction histories on the selected platform based on the preferences of the first user associated with communication device 110 generating the transaction histories and/or the second user associated with communication device 120 receiving the transaction histories. Moreover, predictive post sharing application 140 may post the transaction histories so that they may be interacted with to retrieve transaction information, perform user, item, or merchant lookup, and/or comment on the transaction histories.

Transaction processing application 132 may correspond to one or more processes to execute software modules and associated specialized hardware of transaction processor server 130 to provide payment services to merchants and users, for example though an account and/or payment instruments of the user and/or merchant stored in a digital wallet of the account. In this regard, transaction processing application 132 may correspond to specialized hardware and/or software to establish one or more accounts, including digital wallets storing payment instruments. The services may allow for a payment to the merchant by a user through a payment instrument, including a credit/debit card, banking account, payment account with transaction processor server 130, and/or other financial instrument. In order to establish an account for a merchant and/or user to send and receive payments, transaction processing application 132 may receive information requesting establishment of the payment account. The information may include user personal, business, and/or financial information. Additionally the information may include a login, account name, password, PIN, or other account creation information. The merchant/user may provide a name, address, social security number, or other personal or business information necessary to establish the account and/or effectuate payments through the account. Transaction processing application 132 may further allow the merchant/user to service and maintain the payment account, for example, by adding and removing payment instruments.

Transaction processing application 132 may be used to provide a payment for a transaction to a merchant or other user, for example, between communication device 110 and a merchant device, where processing the transaction causes generation of a receipt or other transaction history. Thus, when communication device 110 wishes to provide payment to a merchant device for a transaction, communication device 110 may provide a stored token or other required information to the merchant device, or may receive transaction information from the merchant device to process the transaction with transaction processor server 130. Transaction processing application 132 may process the transaction using the token or received transaction information. Transaction processing application 132 may utilize data in the token or transaction information to debit an account of the user and provide the payment to an account of the merchant. Transaction processing application 132 may also be used to provide transaction histories for processed transactions for use in predictive analysis on sharing with one or more other users. In further embodiments, the merchant device may transmit the receipt or transaction history to transaction processor server 130 for processing and predictive analysis on sharing with one or more other users.

In various embodiments, transaction processor server 130 includes other applications 134 as may be desired in particular embodiments to provide features to transaction processor server 130. For example, other applications 134 may include security applications for implementing server-side security features, programmatic client applications for interfacing with appropriate application programming interfaces (APIs) over network 150, or other types of applications. Other applications 134 may contain software programs, executable by a processor, including a graphical user interface (GUI), configured to provide an interface to the user when accessing transaction processor server 130, where the user or other users may interact with the GUI to more easily view and communicate information. In various embodiments, other applications 134 may include connection and/or communication applications, which may be utilized to communicate information to over network 150.

Additionally, transaction processor server 130 includes database 136. As previously discussed, the user and/or the merchant may establish one or more digital wallets and/or accounts with transaction processor server 130. Digital wallets and/or accounts in database 136 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 130, e.g., from communication device 110, one or more digital wallets and/or payment accounts belonging to the users may be found. Transaction histories may be stored to database 136 for sharing on a communication platform. Database 136 may also store the user preferences for an account for the user and/or merchant, as well as account information for use in determining when and with what users to share transaction histories.

In various embodiments, transaction processor server 130 includes at least one network interface component 138 adapted to communicate communication device 110 and/or communication device 120 over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
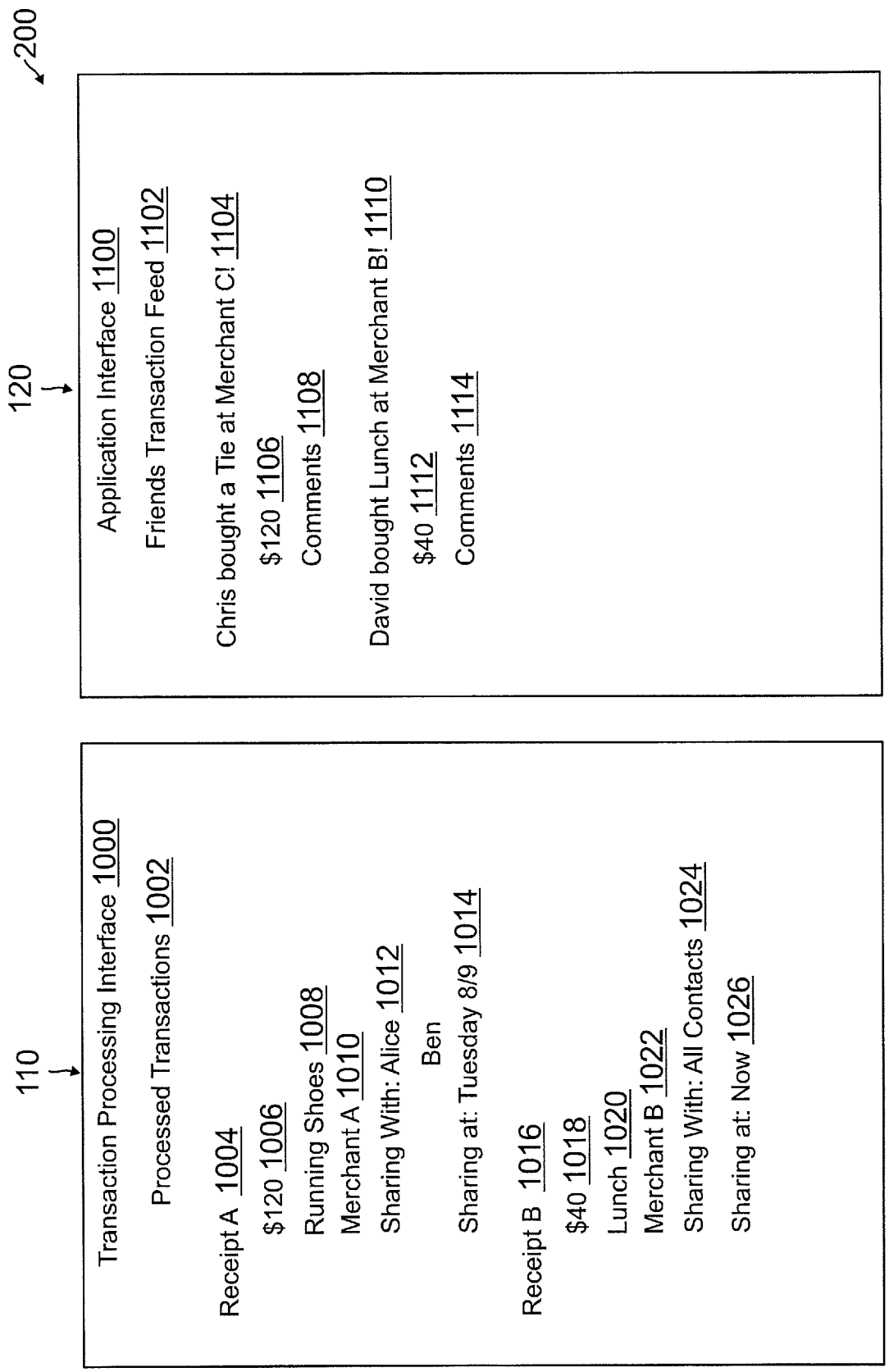
FIG. 2 are exemplary interfaces of two communication devices, where one communication device includes an interface for reviewing transaction histories that may be shared with others and the other communication device views shared transaction histories, according to an embodiment.

FIG. 2 are exemplary interfaces of two communication devices, where one communication device includes an interface for reviewing transaction histories that may be shared with others and the other communication device views shared transaction histories, according to an embodiment. Environment 200 of FIG. 2 includes communication device 110 and communication device 120 corresponding generally to the described features, processes, and components of communication device 110 and communication device 120, respectively, in environment 100 of FIG. 1. In this regard, a first user utilizing communication device 110 may view a transaction processing interface 1000 on communication device 110, where transaction processing interface 1000 corresponds to an interface of an application, such as payment application 112 of communication device 110 in environment 100 of FIG. 1. Additionally, a second user utilizing communication device 120 may view an application interface 1100 on communication device 120, where application interface 1100 corresponds to an interface of an application, such as online posting application 122 of communication device 120 in environment 100 of FIG. 1

Transaction processing interface 1000 may include information for transaction histories of the first user associated with communication device 110, where the transaction histories may document or provide information for processed transactions by the first user using a transaction processing service or other service provider. Thus, transaction processing interface 1000 includes processed transaction 1002, for example, information on one or more transaction histories. For example, transaction processing interface 1000 includes a receipt A 1004 and a receipt B 1016. Receipt A 1004 includes a cost 1006 of $120, an item 1008 for Running Shoes, a merchant 1010 for Merchant A, shared user information 1012 for Alice and Ben, and a predicted time to share 1014 at Tuesday, 8/9. Similarly, receipt B 1016 includes a cost 1018 of $40, an item 1020 for Lunch, a merchant 1022 for Merchant B, shared user information 1012 for all contacts, and a predicted time to share 1014 of now. In this regard, the first user viewing processed transactions 1002 may view transaction information and a transaction history for receipt A 1004 and receipt B 1016, as well as shared user information and a predicted time to share. Receipt A 1004 may have been processed to determine that receipt A 1004 should only be shared with Alice and Ben under shared user information 1012 at predicted time to share 1014 of Tuesday 8/9. For example, item 1008 of Running Shoes may have been purchased as a gift for Alice, who is Ben's sister. Thus, informing Alice or Ben prior to Alice's birthday of or around Tuesday, 8/9 would be detrimental to the first user. Thus, receipt A 1004 will not be shared. Conversely, receipt B 1016 is shared with all contacts under shared user information 1024 and immediately under predicted time to share 1026. Receipt B 1016 may be currently shared with other users, including the second user associated with communication device 120. Additionally, the first user may utilize transaction processing interface 1000 to adjust one or more of shared user information 1012 or 1024 and/or predicted time to share 1014 or 1024, such as by entering new input for identifiers of shared users or deleting shared users, and/or changing times to share.

Application interface 1100 may be utilized to output information to the second user corresponding to communication device 120, including information for one or more transaction histories shared with the second user by a service provider based on predictive analysis of the transaction histories. For example, application interface 1100 includes a friends transaction feed, having a feed or other browse-able list of transaction histories for processed transactions by friends or other contacts of the second user, including the first user associated with communication device 110. For example, friends transaction feed 1102 includes a first notification 1104 of "Chris Bought a Tie at Merchant C!" with an cost 1106 of $30, and comments 1108, such as notes from friends or Chris. First notification 1104 may be shared based on preferences of Chris, or based on predictive analysis that first notification 1104 may be of interest to the second user. Similarly, a second notification 1110 corresponds to receipt B 1016 from transaction processing interface 1000 of communication device 110. In this regard, second notification displays "David Bought Lunch at Merchant B!" with a cost 1112 and comments 1114. Second notification 1110 may be displayed based on shared user information 1012 and predicted time to share 1024 for receipt B 1016.

Figure 3:
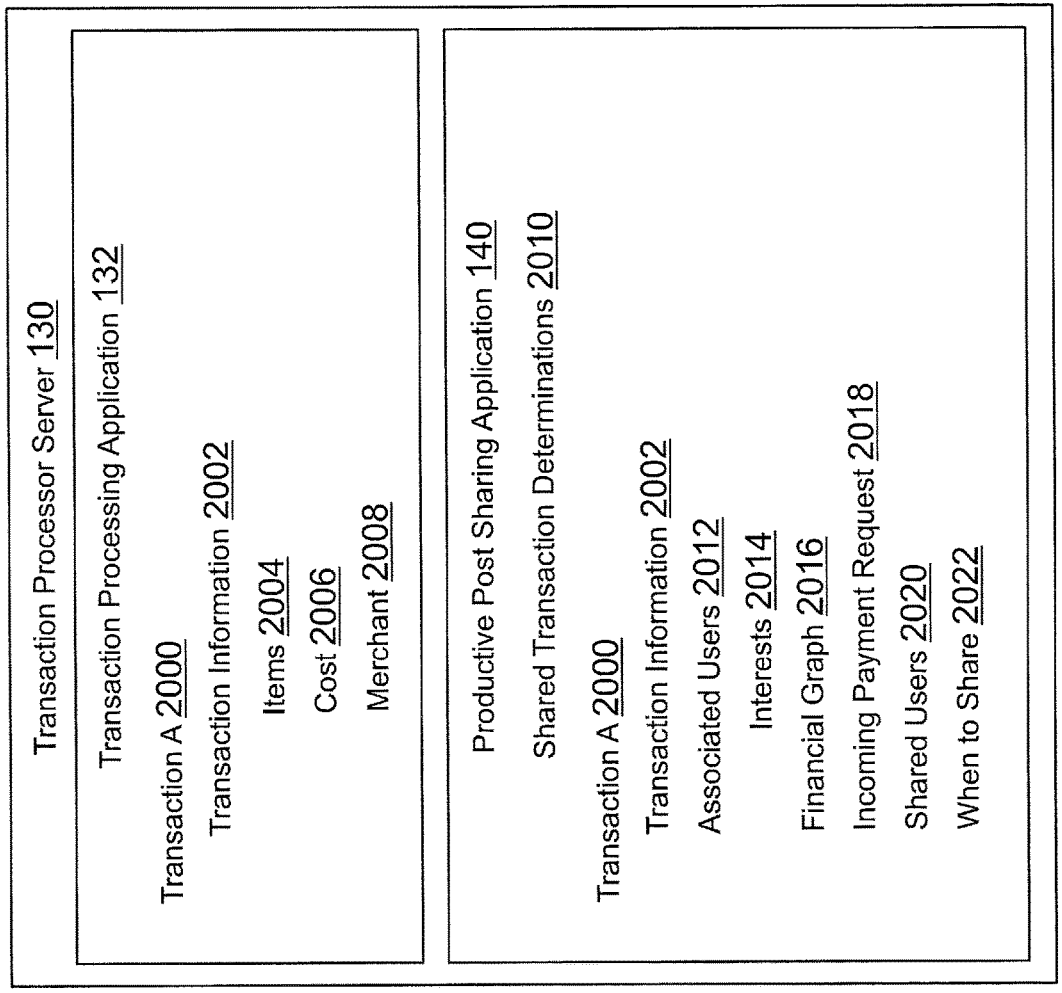
FIG. 3 is an exemplary system environment showing a transaction processor server utilizing a predictive engine for online distribution of sensitive transaction processing information, according to an embodiment.

FIG. 3 is an exemplary system environment showing a transaction processor server utilizing a predictive engine for online distribution of sensitive transaction processing information, according to an embodiment. FIG. 3 includes transaction processor server 130 corresponding generally to transaction processor server 130 discussed in reference to environment 100 of FIG. 1.

Transaction processor server 130 includes predictive post sharing application 140 and transaction processing application 132 corresponding generally to the processes and features discussed in reference to predictive post sharing application 140 and transaction processing application 132 in environment 100 of FIG. 1. In this regard, transaction processing application 132 may be used to process a transaction A 2000 generated by a user using an account of the user, such as a transaction processing and payment account. Transaction A 2000 may be between a first user and a merchant or another seller. Thus, transaction A 2000 includes transaction information 2002, including items 2004, a cost 2006, and a merchant 2008. After processing of transaction A 2000, a transaction history may be generated, such as a receipt that includes the transaction information and other information associated with the transaction.

Additionally, predictive post sharing application 140 may be utilized to determine whether to share one or more transaction histories for a user, such as a transaction history for a transaction processed by transaction processing application 132. Thus, predictive post sharing application 140 includes shared transaction determinations 2010, which may include transaction A 2000 processed by transaction processing application 132 having transaction information 2002. Processing transaction information 2002 with various account information, including associated users 2012 having interests 2014, a financial graph 2016, and/or incoming payment requests 2018 may provide distribution information on a transaction history for transaction A 2000. For example, the distribution information may include shared users 2020 and when to share 2022. Predictive post sharing application 140 may then distribute the transaction history according to the distribution information.

Figure 4:
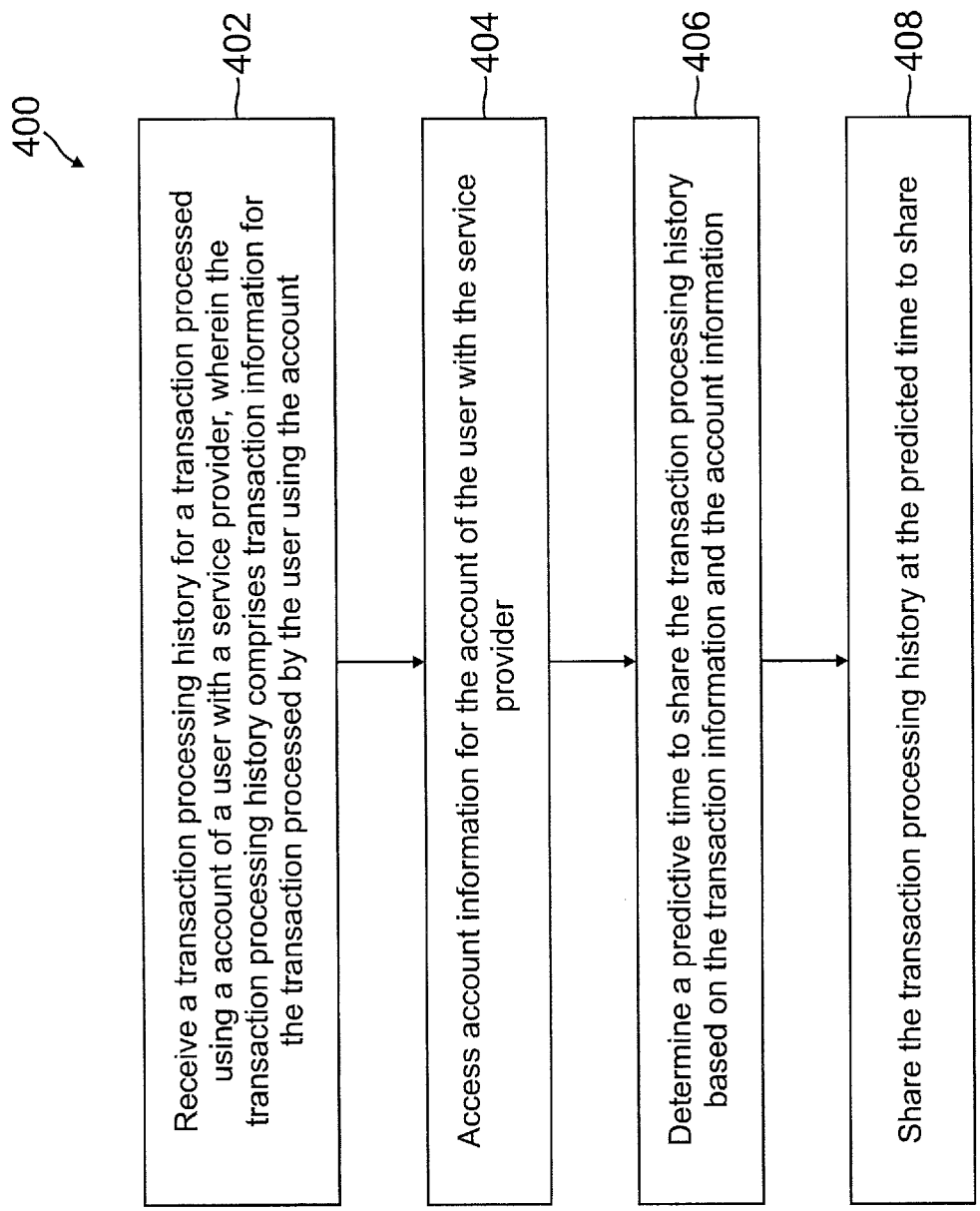
FIG. 4 is a flowchart of an exemplary process for a predictive engine for online distribution of sensitive transaction processing information, according to an embodiment.

FIG. 4 is a flowchart of an exemplary process for a predictive engine for online distribution of sensitive transaction processing information, according to an embodiment. Note that one or more steps, processes, and methods described herein may be omitted, performed in a different sequence, or combined as desired or appropriate.

At step 402, a transaction processing history for a transaction processed using an account of a user with a service provider is received, wherein the transaction processing history comprises transaction information for the transaction processed by the user using the account. The transaction information may comprise at least one of an item purchased in the transaction, a payment cost by the user for the transaction, item information for the item purchased in the transaction, or a seller associated with the transaction. In various embodiments, prior to receiving the transaction processing history, a payment request may be received from at least one other user to the user, wherein sharing the transaction processing history at the predicted time to share comprises sharing the transaction processing history with a subset of users at the predicted time to share, and wherein the subset of users does not include the at least one other user.

At step 404, account information for an account of a user with the service provider system is accessed. The account information may comprise at least one of financial assets or debts of the user, contacts of the user, transaction sharing preferences of the user, a financial graph of the user, incoming payment requests by the user, past purchases of the user, a shopping list of the user, a calendar of the user, or past shared transactions of the user. In various embodiments, the account information may correspond to transaction sharing information for a first user that is associated with a second user. A predicted time to share the transaction processing history is determined based on the transaction information and the account information, at step 406. The predicted time to share may be determined based on one of a financial graph of user, incoming payment requests of the user, social networking activity of the user, a birthdate known to the user and associated with the transaction, travel of the user or an associated user, events of the user or the associated user, or interests of the user or an associated user.

In other embodiments where the account information includes transaction sharing information for a first user and associated with a second user, the transaction sharing information for the first user may comprise travel arrangements by the first user for a trip associated with the second user.

Thus, distribution guidelines may also be determined, where the distribution guidelines to communicate the receipt to the second user may be based on the travel arrangements. The transaction sharing information may also comprise interests shared between the first user and the second user, wherein the distribution guidelines to communicate the receipt to the second user is based on the interests shared between the first user and the second user. The transaction sharing information may also comprises a potential interest of the second user in an item in the transaction processed by the first user, wherein the transaction processing history is communicated to the second user using advertising for the item to the second user. The transaction sharing information may further comprise images captured by the second user, wherein the distribution guidelines shares an item in the transaction associated with the images. In further embodiments, the transaction sharing information comprises one of a social graph of the user and a financial graph of the user.

At step 408, the transaction processing history is shared at the predicted time to share. A request to change the predicted time may be received from the user, and the predicted time may be updated based on the request to change the predicted time. In various embodiments, prior to receiving the request, a transaction review interface may be provided to a communication device of the user, wherein the transaction review interface displays at least the transaction processing history with the predicted time to share. Thus, the request to change may be received through the transaction review interface. Additionally, at least one other user to receive the transaction processing history may be determined using the transaction information and the account information, wherein the transaction processing history is shared with only the at least one other user at the predicted time to share. The at least one other user may comprise a known user, a relative, a spouse, a child, a co-worker, a user associated with purchase of an item in the transaction, wherein the account information comprises contact information for the at least one other user.

Prior to sharing the transaction processing history, at least one other user associated with the user may be determined based on the account information. Thus, user information for at least one other user may be accessed, and sharing the transaction processing history may be with only the at least one other user. The user information for the at least one other user may comprise at least one of personal information, financial information, interests, a shopping list between the user and the at least one other user, communications between the user and the at least one other user, or social networking posts by the at least one other user. In order to share the transaction processing history, the transaction processing history may be shared on one of a social networking feed of the user or a transaction processing feed of the service provider system.

Figure 5:
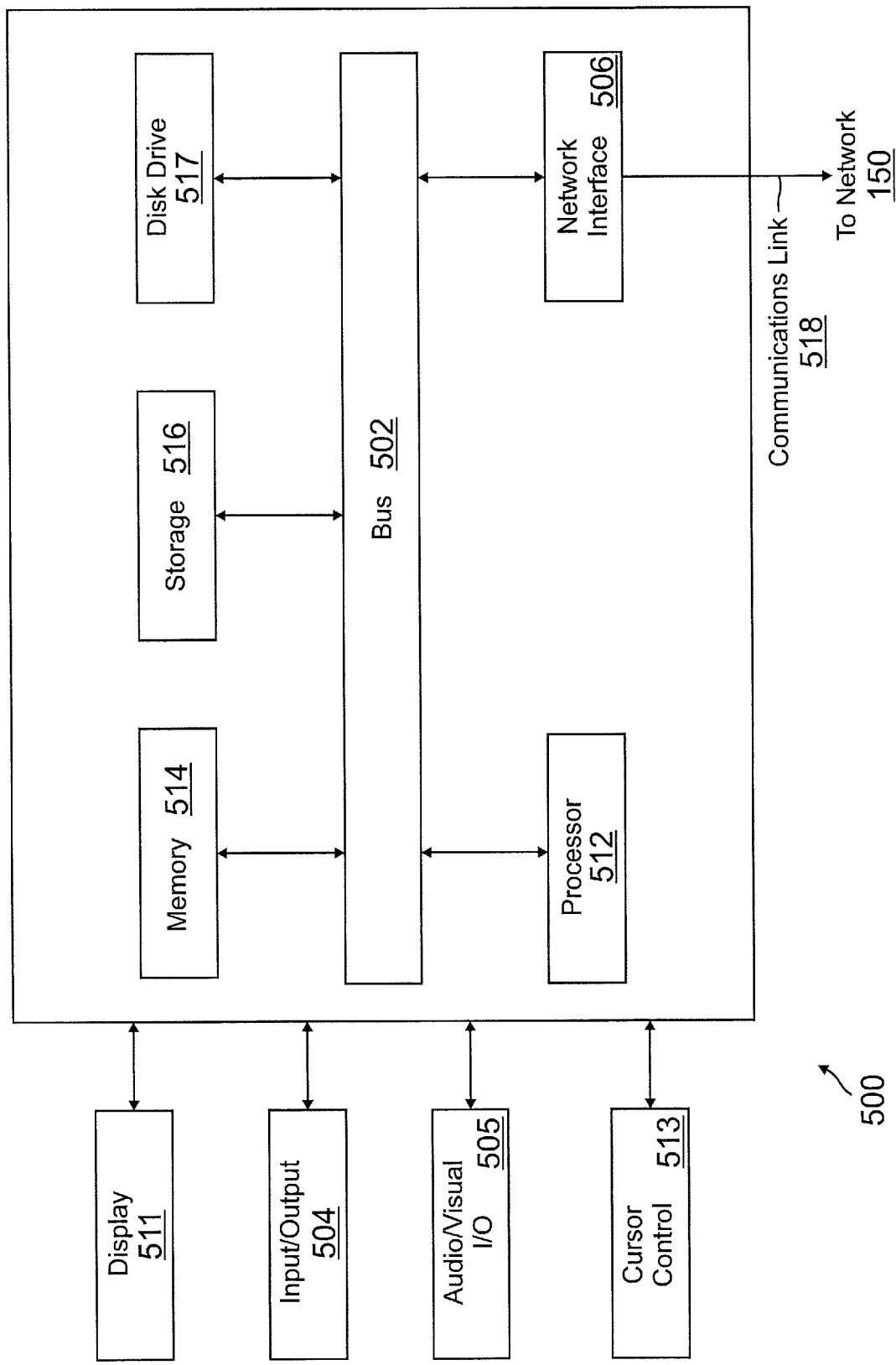
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
    a non-transitory memory storing account information for an account of a user with the service provider system; and
    one or more hardware processors configured to execute instructions to cause the service provider system to perform operations comprising:
        receiving a transaction history for a transaction processed using the account of the user, wherein the transaction history comprises transaction information for the transaction processed for the user using the account;
        accessing the account information from the non-transitory memory;
        determining an upcoming expenditure of the user to another user based on the account information, wherein the upcoming expenditure is to be processed using the account to the another user;
        determining a data feed associated with the account of the user based on the account information, wherein the transaction history is restricted from posting to the data feed based on at least one of the account information, the upcoming expenditure, or the transaction information;
        determining a predicted time to share the transaction history based on the transaction information and the account information;
        determining an online digital platform utilized by the another user to access the data feed;
        preventing the transaction history from being posted to the data feed on the online digital platform until the predicted time to share; and
        sharing the transaction history in the data feed at the predicted time to share.

2. The service provider system of claim 1, wherein the operations further comprise:
    receiving a request to change the predicted time from the user; and
    updating the predicted time based on the request to change the predicted time.

3. The service provider system of claim 2, wherein, prior to the receiving the request, the operations further comprise:
    providing a transaction review interface to a communication device of the user, wherein the transaction review interface displays at least the transaction history with the predicted time to share,
    and wherein the request to change is received through the transaction review interface.

4. The service provider system of claim 1, wherein the transaction information comprises at least one of an item purchased in the transaction, a payment cost by the user for the transaction, item information for the item purchased in the transaction, or a seller associated with the transaction.

5. The service provider system of claim 1, wherein the account information comprises at least one of a financial asset or debt of the user, a contact of the user, a transaction sharing preference of the user, a financial graph of the user, an incoming payment request by the user, a past purchase of the user, a shopping list of the user, a calendar of the user, or a past shared transaction of the user.

6. The service provider system of claim 1, wherein the predicted time to share is determined based on one of a financial graph of user, an incoming payment request of the user, social networking activity of the user, a birthdate known to the user and associated with the transaction, travel of the user or an associated user, an event of the user or the associated user, or an interest of the user or the associated user.

7. The service provider system of claim 1, wherein the operations further comprise:
    determining at least one other user to receive the transaction history using the transaction information and the account information,
    wherein the transaction history is shared with only the at least one other user at the predicted time to share.

8. The service provider system of claim 7, wherein the at least one other user comprises a known user, a relative, a spouse, a child, or the another user associated with a purchase of an item in the transaction, and wherein the account information comprises contact information for the at least one other user.

9. The service provider system of claim 1, wherein, prior to the sharing the transaction history, the operations further comprise:
    determining at least one other user associated with the user based on the account information; and
    accessing user information for at least one other user,
    wherein the sharing the transaction history is with only the at least one other user.

10. The service provider system of claim 9, wherein the user information for the at least one other user comprises at least one of personal information, financial information, interests, a shopping list between the user and the at least one other user, communications between the user and the at least one other user, or social networking posts by the at least one other user.

11. The service provider system of claim 1, wherein prior to the sharing the transaction history, the operations further comprise:

determining a subset of the transaction information in the transaction history to share at the predicted time to share, wherein the subset is determined based on confidentiality preferences of the user, wherein the sharing the transaction history only uses the subset of the transaction information.

12. A method comprising:

receiving, by one or more hardware processors, a transaction history for a transaction processed using an account of a user, wherein the transaction history comprises transaction information for the transaction processed for the user using the account;

accessing, by the one or more hardware processors, account information for the account of the user with a service provider;

determining, by the one or more hardware processors, an upcoming expenditure of the user to another user based on the account information, wherein the upcoming expenditure is to be processed using the account to the another user:

determining, by the one or more hardware processors, a data feed associated with the account of the user based on the account information, wherein the transaction history is restricted from posting to the data feed based on at least one of the account information, the upcoming expenditure, or the transaction information;

determining, by the one or more hardware processors, a predicted time to share the transaction history based on the transaction information and the account information;

determining, by the one or more hardware processors, an online digital platform utilized by the another user to access the data feed:

preventing, by the one or more hardware processors, the transaction history from being posted to the data feed on the online digital platform until the predicted time to share; and sharing, by the one or more hardware processors, the transaction history in the data feed at the predicted time to share.

13. The method of claim 12, wherein the data feed comprises a timeline of user transactional events processed using the account, and wherein the determining the data feed comprises accessing the data feed via the account.

14. The method of claim 12, further comprising:

determining, by the one or more hardware processors, data sharing preferences of the user with the another user for the data feed; and determining, by the one or more hardware processors, that the another user is associated with the transaction history.

15. The method of claim 12, wherein the predicted time to share comprises one of a birthdate, an anniversary date, or a date set with a social networking platform for the another user associated with the user.

16. The method of claim 12, further comprising:

providing a user interface to a device of the user, wherein the user interface comprises an interface option to remove the transaction history from the data feed; and notifying the user of the user interface.

17. The method of claim 12, wherein the transaction history is restricted from posting to the data feed further based on at least one of an interest of another user, travel of the another user, an event attended by the another user, or a search history of the another user.

18. A non-transitory machine-readable medium having stored thereon machine-readable instructions executable to cause a machine to perform operations comprising:

receiving a transaction history for a transaction processed using an account of a user, wherein the transaction history comprises transaction information for the transaction processed for the user using the account;

accessing account information for the account of the user with a service provider;

determining an upcoming expenditure of the user to another user based on the account information, wherein the upcoming expenditure is to be processed using the account to the another user;

determining a data feed associated with the account of the user based on the account information, wherein the transaction history is restricted from posting to the data feed based on at least one of the account information, the upcoming expenditure, or the transaction information;

determining a predicted time to share the transaction history based on the transaction information and the account information;

determining an online digital platform utilized by the another user to access the data feed;

preventing the transaction history from being posted to the data feed on the online digital platform until the predicted time to share; and sharing the transaction history in the data feed at the predicted time to share.

19. The non-transitory machine-readable medium of claim 18, wherein the data feed comprises one of a social networking feed or a feed in transaction processing application or website associated with a transaction processor service.

20. The non-transitory machine-readable medium of claim 18, wherein the account information comprises distribution guidelines for transactions processed by the account, and wherein the distribution guidelines are based on travel arrangements by the user for a trip associated with another user.

* * * * *